(12) United States Patent
Goyal et al.

(10) Patent No.: US 12,493,776 B2
(45) Date of Patent: Dec. 9, 2025

(54) MICROGENRE-BASED HYPER-PERSONALIZATION WITH MULTI-MODAL MACHINE LEARNING

(71) Applicant: Samsung Electronics Co., Ltd., Suwon-si (KR)

(72) Inventors: Palash Goyal, San Jose, CA (US); Saurabh Sahu, San Bruno, CA (US); Shalini Ghosh, Menlo Park, CA (US); Hyun Chul Lee, Seattle, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1030 days.

(21) Appl. No.: 17/368,683

(22) Filed: Jul. 6, 2021

(65) Prior Publication Data

US 2022/0245424 A1    Aug. 4, 2022

Related U.S. Application Data

(60) Provisional application No. 63/143,373, filed on Jan. 29, 2021.

(51) Int. Cl.
*G06N 3/049* (2023.01)
*G06N 3/084* (2023.01)

(52) U.S. Cl.
CPC ............. *G06N 3/049* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 9,253,511 | B2 | 2/2016 | Chen et al. |
| 10,303,768 | B2 * | 5/2019 | Divakaran ............. G06V 20/46 |
| 10,339,421 | B2 * | 7/2019 | Mei ....................... G06V 10/764 |
| 10,402,697 | B2 * | 9/2019 | Yang ...................... G06N 3/044 |
| 10,789,427 | B2 | 9/2020 | Shazeer et al. |
| 2018/0189572 | A1 | 7/2018 | Hori et al. |
| 2021/0027113 | A1 | 1/2021 | Goldstein et al. |

FOREIGN PATENT DOCUMENTS

| | | |
|---|---|---|
| CN | 106886601 B | 9/2018 |
| CN | 107346328 B | 9/2020 |
| CN | 112203152 A | 1/2021 |

(Continued)

OTHER PUBLICATIONS

Long, Xiang, et al. "Multimodal keyless attention fusion for video classification." Proceedings of the aaai conference on artificial intelligence. vol. 32. No. 1. 2018. (Year: 2018).*

(Continued)

*Primary Examiner* — Eric Nilsson

(57) ABSTRACT

A method includes accessing video data that includes at least two different modalities. The method also includes using a convolutional neural network layer to incorporate temporal coherence into a machine learning model architecture configured to process the video data. The method further includes learning dependency among the at least two different modalities in an attention space of the machine learning model architecture. In addition, the method includes predicting one or more correlations among the at least two different modalities.

20 Claims, 11 Drawing Sheets

(56) References Cited

FOREIGN PATENT DOCUMENTS

KR    10-2080986 B1    2/2020

OTHER PUBLICATIONS

Al-Waisy, Alaa S., et al. "A multimodal deep learning framework using local feature representations for face recognition." Machine Vision and Applications 29 (2018): 35-54. (Year: 2018).*
Kim, Eun-Sol, et al. "Temporal attention mechanism with conditional inference for large-scale multi-label video classification." Proceedings of the European Conference on Computer Vision (ECCV) Workshops. 2018. (Year: 2018).*
Cheung, S-S., and Avideh Zakhor. "Efficient video similarity measurement with video signature." IEEE Transactions on Circuits and Systems for video Technology 13.1 (2003): 59-74. (Year: 2003).*
International Search Report and Written Opinion of the International Searching Authority regarding International Patent Application No. PCT/KR2022/001370 dated Apr. 29, 2022, 9 pages.

\* cited by examiner

MICROGENRE-BASED HYPER-PERSONALIZATION WITH MULTI-MODAL MACHINE LEARNING

CROSS-REFERENCE TO RELATED APPLICATION AND PRIORITY CLAIM

This application claims priority under 35 U.S.C. § 119(e) to U.S. Provisional Patent Application No. 63/143,373 filed on Jan. 29, 2021, which is hereby incorporated by reference in its entirety.

TECHNICAL FIELD

This disclosure relates generally to recommendation systems. More specifically, this disclosure relates to techniques for microgenre-based hyper-personalization with multi-modal machine learning.

BACKGROUND

Recommendation systems play a pivotal role in a wide range of web applications and services, such as in terms of distributing online content to targets who are likely to be interested in it. Recommendation techniques are also applicable to many relevant fields, such as user response prediction, like click-through-rate (CTR) prediction and conversion rate (CVR) prediction, and so forth in digital advertising. Many efforts in these domains have been emphasized with respect to developing more effective models to achieve better performance.

Certain models for video classification use attention-based models, such as attention-recurrent neural networks (attention-RNN) or transformer-based architectures, to get video-level representations from temporal features. However, these architectures are not designed to utilize temporal coherence, which is a fundamental property of videos. Furthermore, existing multi-modal video classification architectures do not influence the attention computation of one modality with another.

SUMMARY

This disclosure provides techniques for microgenre-based hyper-personalization with multi-modal machine learning.

In a first embodiment, an electronic device includes at least one memory configured to store a database. The electronic device also includes at least one processor configured to access video data that includes at least two different modalities. The at least one processor is also configured to implement a convolutional neural network layer to incorporate temporal coherence into a machine learning model architecture configured to process the video data. The at least one processor is further configured to learn dependency among the at least two different modalities in an attention space of the machine learning model architecture. In addition, the at least one processor is configured to predict one or more correlations among the at least two different modalities.

In a second embodiment, a method includes accessing video data that includes at least two different modalities. The method also includes using a convolutional neural network layer to incorporate temporal coherence into a machine learning model architecture configured to process the video data. The method further includes learning dependency among the at least two different modalities in an attention space of the machine learning model architecture. In addition, the method includes predicting one or more correlations among the at least two different modalities.

In a third embodiment, a non-transitory machine-readable medium contains instructions that when executed cause at least one processor of an electronic device to access video data that includes at least two different modalities. The medium also contains instructions that when executed cause the at least one processor to implement a convolutional neural network layer to incorporate temporal coherence into a machine learning model architecture configured to process the video data and learn dependency among the at least two different modalities in an attention space of the machine learning model architecture. The medium further contains instructions that when executed cause the at least one processor to predict one or more correlations among the at least two different modalities.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first"

and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
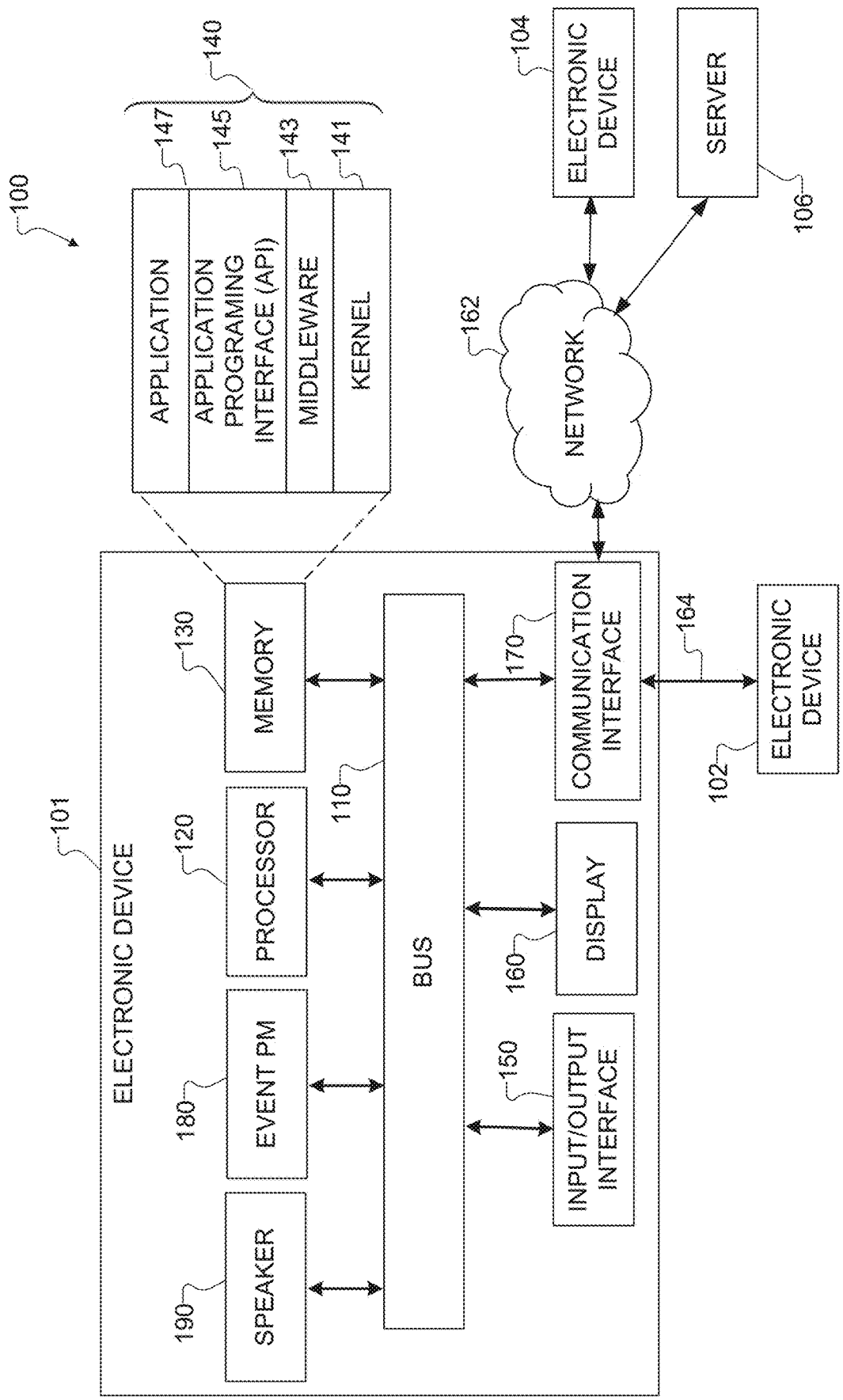
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, recommendation systems play a pivotal role in a wide range of web applications and services, such as in terms of distributing online content to targets who are likely to be interested in it. Recommendation techniques are also applicable to many relevant fields, such as user response prediction, like click-through-rate (CTR) prediction and conversion rate (CVR) prediction, and so forth in digital advertising. Many efforts in these domains have been emphasized with respect to developing more effective models to achieve better performance. Additionally, video data routinely possesses substantial temporal coherence. For example, successive frames in a video can have similar objects or categories. While a recommendation model that is processing the video should be able to process neighboring frames in a similar way, certain models cannot handle the temporal coherence in video.

Embodiments of the present disclosure address the problem of multi-modal content recommendation using an artificial intelligence (AI) agent that processes data in multiple modalities, such as video, images, audio, and language, and learns how to recommend new multi-media content to a user. For example, when a user is viewing programs on SAMSUNG TV, certain characteristics of the current video, as well as other videos seen by the user from the user history, are known. Certain embodiments of the present disclosure process different characteristics of the current video, as well as those in the user history, and infer relevant matching characteristics. Based on the relevant matching characteristics, the AI agent will be able to recommend new programs of interest to the user. Embodiments of the present disclosure also provide a system and method that can be used for ad targeting to show relevant ads to the user.

Certain embodiments of the present disclosure focus on fine-grained categories of the video that are identifiable from multiple modalities. For example, an image of a crowd in a video and a sound of music in the audio could help identify that the video is about an entertainment event or a concert. It should be noted that fine-grained custom categories are one characteristic and that embodiments of the present disclosure can be applied to other characteristics, such as salient objects or activities, that can be inferred from the video, as well. Given a new video program or video ad, a system and method according to embodiments of the present disclosure infer the necessary characteristics of this new video content. Once the fine-grained categories and other characteristics are determined from the video and the user history, the disclosed system and method can use that information for accurate content recommendation or ad targeting.

Certain embodiments of the present disclosure provide a system and method configured to provide microgenre-based hyper-personalization with multi-modal machine learning. Certain embodiments include a system and method for temporal coherence (TC). As noted above, video data has substantial temporal coherence, and successive frames in a video can have similar objects or categories. Embodiments of the present disclosure provide a recommendation model that is capable of processing the neighboring frames of the video in a similar way and provides a multi-layer (ML) model that can handle the temporal coherence in video. Certain embodiments include cross-modal non-linear guided attention (CM-NGA). Embodiments of the present disclosure provide a recommendation model that focuses on cross-modal learning, namely utilizing the information from one modality to benefit learning in another modality. This is especially useful for making the AI agent more accurate and resilient to errors in inferring the categories. For example, even if the video goes blank, one may hear the sounds of gunfire and explosions in the audio track to identify that the program relates to the "action/war" category. Certain embodiments include correlation tower (CT). Embodiments of the present disclosure provide a recommendation model that identifies a micro-genre from one modality. Identifying the micro-genre from one modality can often aid another modality, but that cross-modal learning depends on the amount of correlation between the audio and video channels in the data. Embodiments of the present disclosure provide a recommendation model that determines when the modalities are useful for each other.

FIG. 1 illustrates an example network configuration 100 in accordance with this disclosure. The embodiment of the network configuration 100 shown in FIG. 1 is for illustration only. Other embodiments could be used without departing from the scope of the present disclosure.

As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, an event processing module 180, or a speaker 190. In some embodiments, the electronic device 101 may exclude at least one of the components or may add another component.

The bus 110 may include a circuit for connecting the components 120-190 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In certain embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
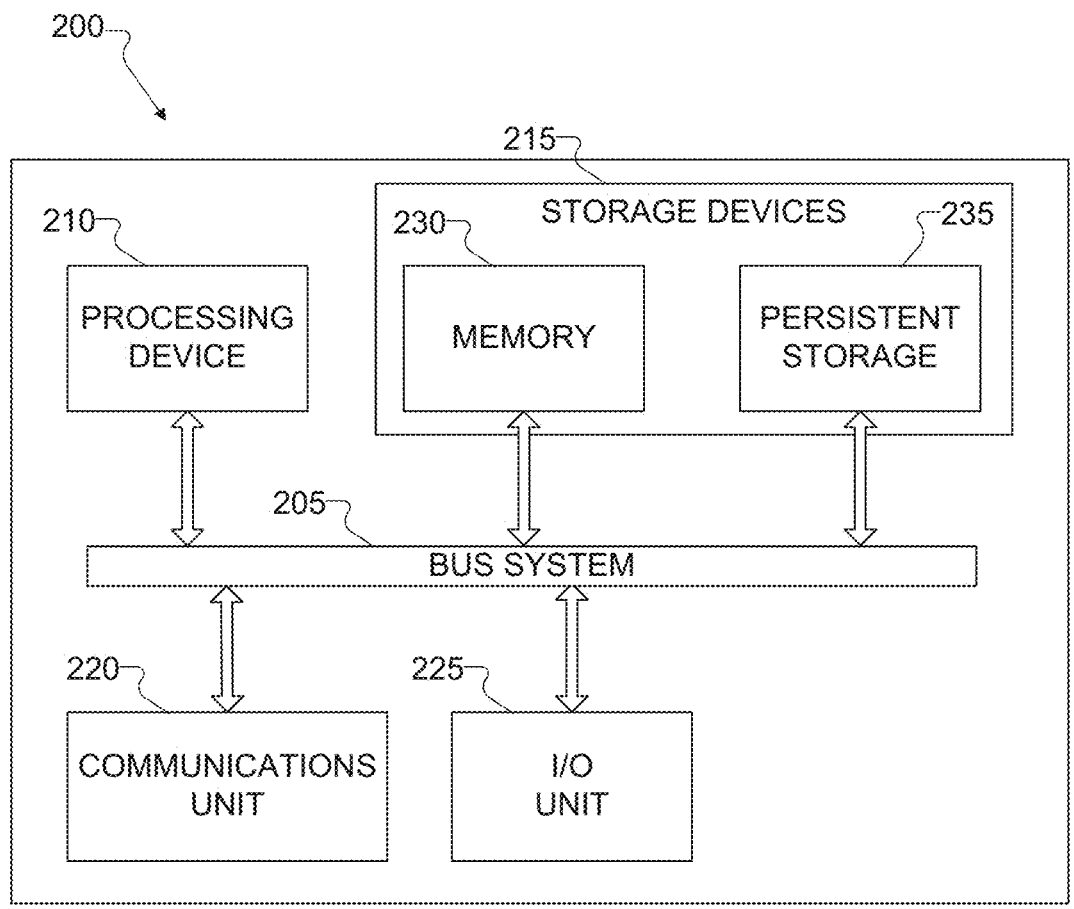
FIG. 2 illustrates an example server in accordance with this disclosure.

FIG. 2 illustrates an example server 200 in accordance with this disclosure. The embodiment of the server 200 shown in FIG. 2 is for illustration only, and other embodiments could be used without departing from the scope of the present disclosure. According to certain embodiments, the server 200 serves as a master platform for providing, maintaining, and updating video information such as video files, video search history, video data, and the like, for client devices (for example, device 101 in FIG. 1).

In the example shown in FIG. 2, the server 200 includes a bus system 205, which supports communication between at least one processing device 210, at least one storage device 215, at least one communications unit 220, and at least one I/O unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. According to certain embodiments, the memory 230 provides non-transitory storage for a global stable semantic map or visual assets to be provided as augmented reality content to defined locations within a stable semantic map.

The communications unit 220 supports communications with other systems or devices. For example, the communications unit 220 could include a network interface card or a wireless transceiver facilitating communications over the network 162 or 164. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In certain embodiments, the processing device 210 is configured to communicate with the electronic device 101 to download or stream multimedia content, such as images, video, or sound. In certain embodiments, the processing device 210 includes a recommendation model that can collect data relating to selections by the user. In certain embodiments, the processing device 210 can obtain the data related to the selections by the user in real time.

In a microgenre-based hyper-personalization system having a multi-modal video classification model of the present disclosure, an AI agent (comprising one or more ML models) can process and understand multiple modalities (e.g., image, video, text, and audio) of a video to get fine-grained categories represented in the video. The ability to process and understand multiple modalities of a video is referred to as task multi-modal video categorization or classification. A multi-modal video classification model takes temporal audio and visual features as input and gets a video-level representation that is then passed through fully-connected multi-layer perceptron (MLP) network to get the video-level prediction. While training, the multi-modal video classification model computes the cross-entropy loss with respect to ground truth video labels and updates the weights of learnable parameters using back-propagation as is done in supervised learning scenarios. Once trained, the model is used to predict the classes of unseen test videos. The purpose of getting the data from multiple modalities is to make the AI agent more accurate and resilient to errors in inferring the categories. For example, even if the video goes blank, one may hear the sounds of gunfire and explosions in the audio track to identify that the program relates to the "action/war" category. The microgenre-based hyper-personalization system includes a model configured for:

Temporal coherence (TC): The model incorporates temporal coherence into video processing ML models, using them to influence the model architecture and hence the prediction mechanism. A temporal coherence can be efficiently instantiated in multiple architectures (e.g., attention- RNN, NetVLAD, and transformer models) using a single convolutional neural network layer.

Cross-modal non-linear guided attention (CM-NGA): The model can learn dependencies between different modalities. That is, the model learns this in the attention space as opposed to input or output space, making it more accurate and robust. The microgenre-based hyper-personalization system learns this dependency and can use it in conjunction with many video categorization approaches, including attention-RNN, NetVLAD and transformer approaches.

Correlation tower (CT): The model can predict correlation between various modalities of the data—the model identifies when one modality is correlated with other modalities and controls the use of cross-modal learning accordingly. Using this correlation tower in conjunction with the cross-modal learning leads to a superior model capable of understanding the interdependencies between the modalities.

Figure 3:
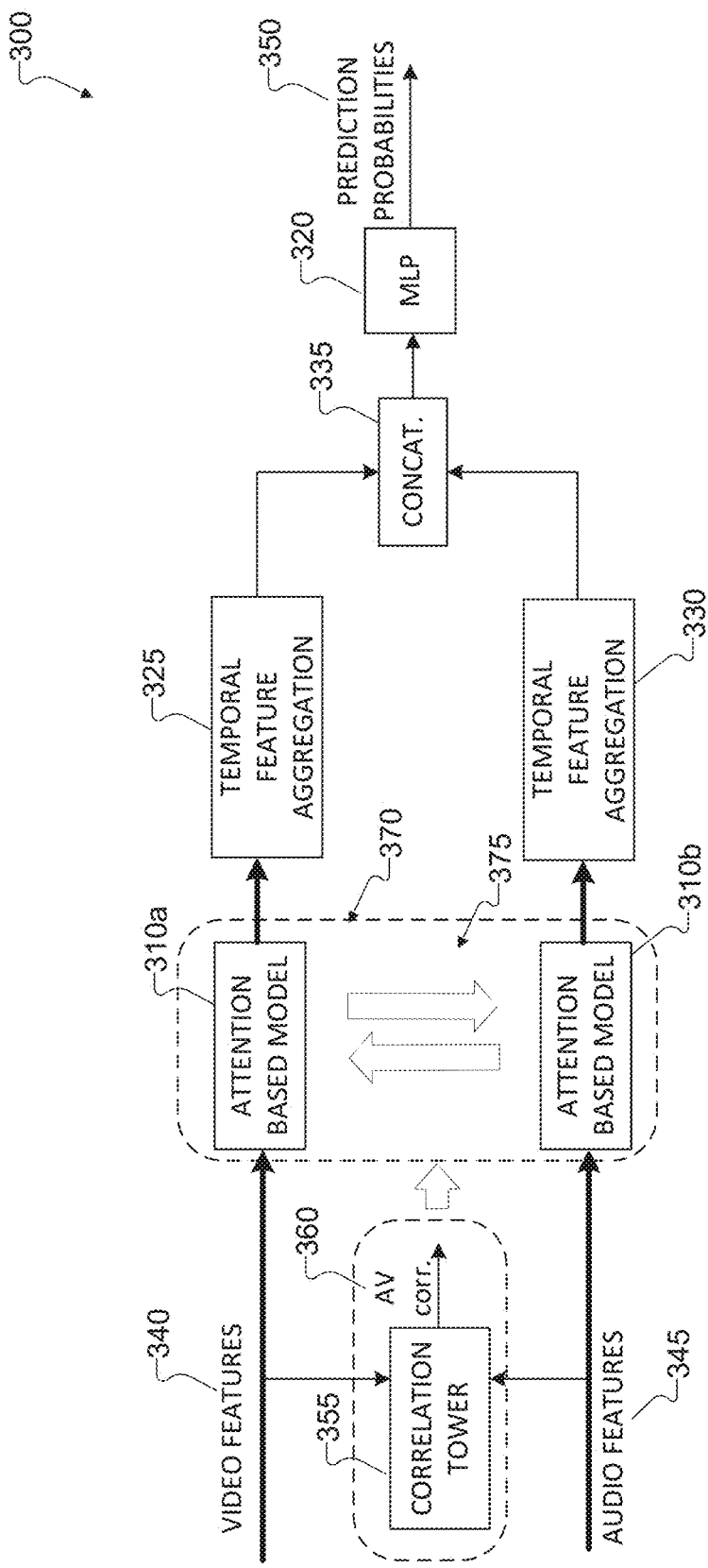
FIG. 3 illustrates an example attention-based multi-modal video classification system in accordance with this disclosure.

FIG. 3 illustrates an example attention-based multi-modal video classification system 300 in accordance with this disclosure. The embodiment of the attention-based multi-modal video classification system 300 shown in FIG. 3 is for illustration only. Other embodiments could be used without departing from the scope of the present disclosure.

Some models for video classification use attention-based models, such as attention-recurrent neural networks (attention-RNN) or transformer-based architectures, to get video-level representations from temporal features. However, these architectures are not designed to utilize temporal coherence, which is a fundamental property of videos. Furthermore, existing multi-modal video classification architectures do not influence the attention computation of one modality with another. The attention-based multi-modal video classification system 300 bridges these gaps. For example, the attention-based multi-modal video classification system 300 is configured to support the following features:

(1) Temporal coherence (TC): The system 300 incorporates temporal coherence into video processing ML models. The attention-based multi-modal video classification system 300 ensure frames in videos that are in the same neighborhood in a video segment have similar fine-grained categories associated with them. The attention-based multi-modal video classification system 300 ensures that any attention values corresponding to frames in a neighborhood have similar values, as long as there is no scene transition between those frames 2) Cross-modal non-linear guided attention (CM-NGA): The system 300 learns dependencies between different modalities in an attention space, as opposed to the input or output space, making it more accurate and robust. The attention-based multi-modal video classification system 300 computes the attention in one modality while taking into account how the attention is computed in the other modality.

3) Correlation tower (CT): The system 300 develops a correlation tower model to predict correlations between various modalities of the data. The attention-based multi-modal video classification system 300 identifies when one modality is correlated with other modalities and controls the use of cross-modal learning accordingly. The attention-based multi-modal video classification system 300 can attenuate the guided attention framework based on correlation values between the two modalities.

The attention-based multi-modal video classification system 300 includes a number of neural networks in which each modality has its own tower. For example, the attention-based multi-modal video classification system 300 can include trainable neural networks configured as a correlation tower 305, a first attention-based model 310a for video modality, a second attention-based model 310b for audio modality, and an MLP 320. The attention-based multi-modal video classification system 300 also includes pre-defined functional components such as a first temporal feature aggregation module 325, a second temporal feature aggregation module 330, and a concatenation module 335.

The attention-based multi-modal video classification system 300 is configured to compute video features 340 and audio features 345 from multimedia content, such as a video. The video features 340 and audio features 345 are temporal features. For every one second (1s) or other portion of the video, the attention-based multi-modal video classification system 300 computes the video features 340, such as from a red-green-blue (RGB) frame. The attention-based multi-modal video classification system 300 also computes the audio features 345, such as from a background track in the multimedia content.

The attention-based multi-modal video classification system 300 includes a correlation tower 355. The correlation tower 355 receives the video features 340 and audio features 345 and computes an audio-video correlation coefficient 360. In some embodiments, the audio-video correlation coefficient 360 can be a number between zero (meaning the audio features and video features are not correlated at all) and one (meaning the audio features and video features are quite correlated).

The video features 340 are passed into the first attention-based model 310a. In certain embodiments, the first attention-based model 310a is a self-attention-based transformer model or an attention model. The first attention-based model 310a is a trainable neural network configured to compute a robust representation that is contextualized based on neighboring frames. That is, the first attention-based model 310a is configured to apply an attention to the video features 340 of a first frame based on attention given to neighboring frames. The output from the first attention-based model 310a is provided to the first temporal feature aggregation module 325. The first temporal feature aggregation module 325 computes a mean across the temporal axis to obtain one vector representation for a video.

The audio features 345 are passed into the second attention-based model 310b. In certain embodiments, the second attention-based model 310b is a self-attention-based transformer model or an attention model. The second attention-based model 310b is a trainable neural network configured to compute a robust representation that is contextualized based on neighboring frames. That is, the second attention-based model 310b is configured to apply an attention to the audio features 345 based on attention given to neighboring frames. The output from the second attention-based model 310b is provided to the second temporal feature aggregation module 330. The second temporal feature aggregation module 330 computes a mean across the temporal axis to obtain one vector representation for audio corresponding to the video.

The first attention-based model 310a and second attention-based model 310b are configured for TC and, as such, will account for temporal coherence changes. Therefore, TC can be enforced in any model. That is, since the architecture of the first and second attention-based models 310a, 310b are applied equally to the video modality and audio modality, the model does not need to be a multi-modal system to enforce TC.

The attention-based multi-modal video classification system 300 also includes a cross-modal module 370. The cross-modal module 370 is a CM-NGA framework that receives at least two modalities to influence the attention computation in at least one of the modalities by another modality. The cross-modal module 370 incudes a CM-NGA framework 375 that receives the audio-video correlation coefficient 360 and temporal coherence changes from each of the first attention-based model 310a and the second attention-based model 310b. The audio-video correlation coefficient 360 is used to modulate how much cross-modal effect should occur. The cross-modal module 370 provides attention computation regarding the audio features 345 from the second attention-based model 310b to the first attention-based model 310a. The cross-modal module 370 also provides attention computation regarding the video features 340 from the first attention-based model 310a to the second attention-based model 310b.

The concatenation module 335 concatenates the video output of the first temporal feature aggregation module 325 and the audio output of the second temporal feature aggregation module 330. An output of the concatenation module 335 is passed through MLP 320 (or fully connected layers) to obtain a final prediction and prediction probabilities 350.

Figure 4:
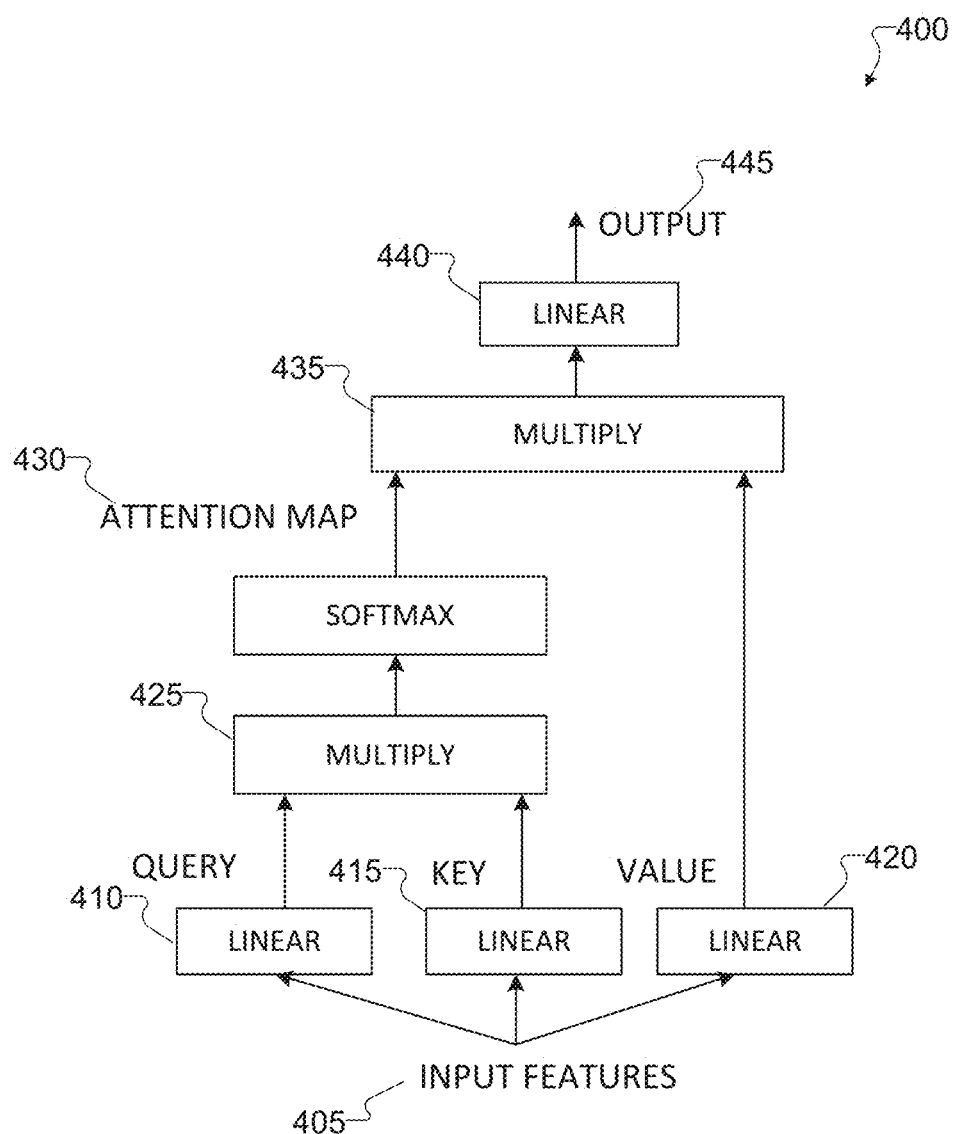
FIG. 4 illustrates an example self-attention block in accordance with this disclosure.

FIG. 4 illustrates an example self-attention block 400 in accordance with this disclosure. The embodiment of the self-attention block 400 shown in FIG. 4 is for illustration only, and other embodiments could be used without departing from the scope of the present disclosure.

In the example shown in FIG. 3, an end-to-end video classification model that uses an "attention-based model" to get relevant representations from input features is illustrated. The attention-based models can be attention-RNNs or transformer-based architectures. In certain examples, transformer-based architectures may perform better than attention-RNN based models. With respect to FIG. 4, a "self-attention" block, which is the core component of any transformer-based architecture, is described.

The self-attention block 400 receives input features 405 and projects the input feature matrices (which can be video/audio features extracted from a video) onto n-learnable subspaces (called "heads"). Each head is associated with "query" 410, "key" 415, and "value" 420 matrices. Each row in these matrices corresponds to the features extracted at a particular time-step. "Query" 410 and "key" 415 matrices are multiplied 425 to get an attention map 430, where element $\alpha_{ij}$ captures the relevance of time-step i with respect to time-step j. For example, in a three-hundred frame video, a 300×300 matrix is produced, where each element with IJ represents an attention of frame I with respect to frame J. It is then multiplied 435 with the "value" matrix 420, generating one output per head. These are then concatenated across heads and multiplied with another learnable matrix 440 to get the final output 445 of the block. A mean is taken across time to get a video-level representation, which is passed to subsequent MLP layers. In the example shown in FIG. 4, the "query" 410, "key" 415, and "value" 420 matrices and the learnable matrix 440 are learnable parameters, and the remaining blocks are pre-defined mathematical operations.

The self-attention block 400 does not account for TC. That is, when the query key and value matrices were formed, each temporal feature is processed through a linear matrix and is multiplied by itself and is not influenced by other features of neighboring timesteps.

Figure 5:
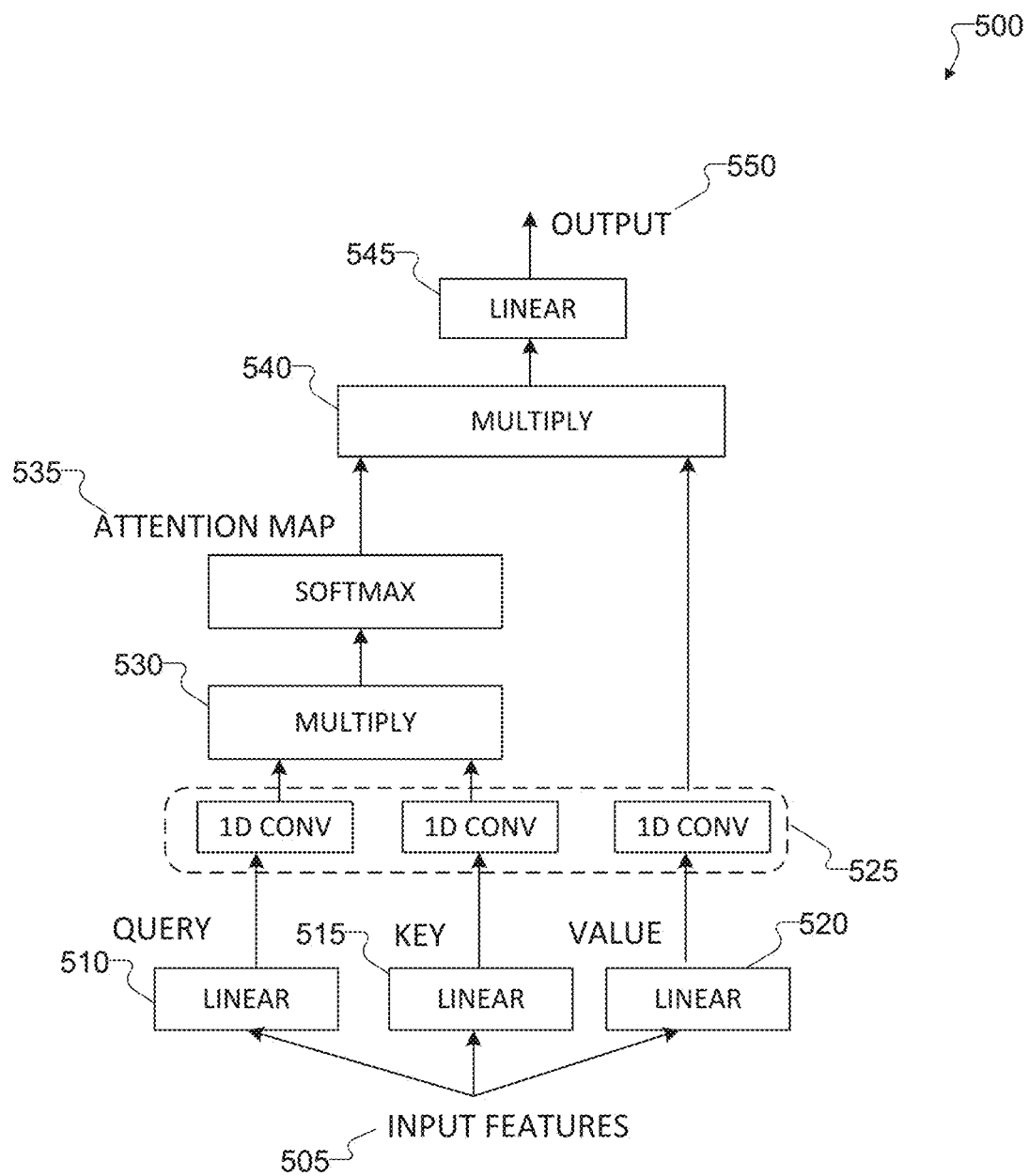
FIG. 5 illustrates an example temporal coherence (TC) self-attention block in accordance with this disclosure.

FIG. 5 illustrates an example TC self-attention block 500 in accordance with this disclosure. The embodiment of the TC self-attention block 500 shown in FIG. 5 is for illustration only, and other embodiments could be used without departing from the scope of the present disclosure. The TC self-attention block 500 can be configured the same as, or similar to, an attention-based model 310 of FIG. 3. In the example shown in FIG. 5, only the operations for one head and one modality are depicted for clarity, but other numbers of heads and modalities could be used without departing from the scope of the present disclosure.

As noted here, the attention-based multi-modal video classification system 300 is configured to enforce TC in self-attention blocks. This ensures that (a) frames in videos that are in the same neighborhood in a video segment have similar fine-grained categories associated with them and (b) if the model uses attention variables to indicate where it is focusing (e.g., self-attention blocks), the attention values corresponding to frames in a neighborhood have similar values if there is no scene transition between the frames being considered (indicating that the model is focusing on the same region). That is, if the frames are similar, the query, key, and value matrices for those particular frames should also look similar.

Based on the TC principle, the attention variable and the final output for frame i are influenced by its neighborhood $N_i$. To achieve this, before computing the output of the self-attention block, temporal coherence is enforced in the query, key, and value matrices so that each particular time-step is influenced by its neighbors. Hence, each row of the query, key, and value matrices can be modified by taking a weighted combination of its neighboring time-steps, where the weights are determined by the similarity between the frames i and j. This can involve computing pair-wise distances between the video frames, which can be computationally intensive for longer videos. Hence, the weights can be approximated, such as by a trainable convolutional layer, that learns the pair-wise dependence between frames over a certain neighborhood for a large number of videos present in the training set. Accordingly, the attention given to similar frames should also be similar due to the similar content.

In the example shown in FIG. 5, the TC self-attention block 500 receives input features 505. Each head is associated with "query" 510, "key" 515, and "value" 520 matrices. Each row in these matrices corresponds to the features extracted at a particular time-step. A number of one-dimensional (1-D) convolution layers 525 are utilized to take in the query 510, key 515 and value 515 matrices and convolve them with learnable filters along the temporal dimension. The output of each of the 1-D convolution layers 525 is then used to compute the attention variables and the final output of the modified self-attention block. The outputs of the "query" 510 and "key" 515 matrices through the 1-D convolution layers 525 are multiplied 530 to obtain an attention map 535, where element $\alpha_{ij}$ captures the relevance of time-step i with respect to time-step j. The attention map 535 is then multiplied 540 with the "value" 520 matrix, generating one output per head. These are then concatenated across heads and multiplied with another learnable matrix 545 to get the final output 550 of the block. A mean is taken across time to get a video-level representation, which is passed to subsequent MLP layers. Therefore, the inclusion of the 1-D convolution layers 525 enables enforcement of TC in both modalities.

In the example shown in FIG. 5, the "query" 510, "key" 515, and "value" 520 matrices, the learnable matrix 545, and the 1-D convolution layers 525 are learnable parameters, and the remaining blocks are pre-defined mathematical operations. Therefore, the TC self-attention block 500 includes three learnable layers, which enforces that the frames in a video are in a same neighborhood. As such, the frames will receive similar attention values. Additionally, the final prediction on these frames, which are related to each other, will be similar.

Utilizing the 1-D convolution layers 525 in the temporal domain edits the values of a particular frame based on its neighboring values, and the amount of change being done on a particular frame depends upon the convolution of kernel weights learned during propagation. Proper initialization of the convolutional kernels leads to an improvement in video classification performance. In certain embodiments, the convolutional layer parameters are shared across the different attention heads, which leads to less trainable parameters. In certain embodiments, different convolutional filters are used for different heads to enforce temporal coherence in the TC self-attention blocks 500.

According to embodiments of the present disclosure, the TC self-attention blocks 500 ensure that both types of temporal coherence outlined above can be encoded by just having a single learnable convolutional layer in the final deep neural network model, which makes it very efficient to enforce it during model inference. The TC self-attention blocks 500 enable an efficient implementation of temporal coherence in a deep neural network model for video analysis.

Figure 6:
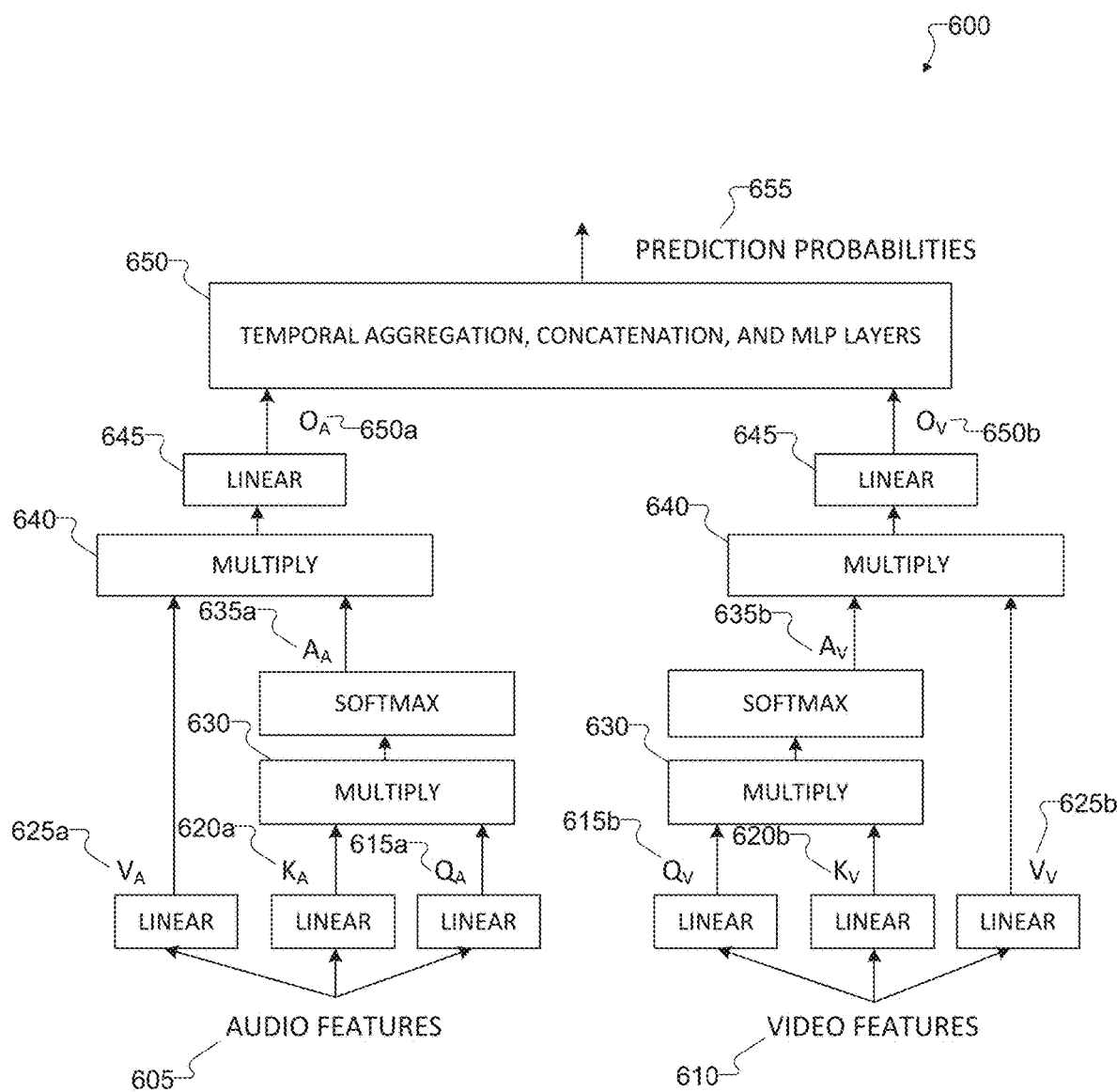
FIG. 6 illustrates an example multi-modal video classification model in accordance with this disclosure.

FIG. 6 illustrates an example multi-modal video classification model 600 in accordance with this disclosure. The embodiment of the multi-modal video classification model 600 shown in FIG. 6 is for illustration only, and other embodiments could be used without departing from the scope of the present disclosure. In the example of the baseline transformer-based multi-modal video classification model 600 shown in FIG. 6, Q denotes query, K denotes key, V denotes value, A denotes attention map, and O denotes an output representation of the self-attention block. Subscript V denotes video modality, and subscript A denotes audio modality.

The multi-modal video classification model 600 includes two classification towers in which a first classification tower receives audio features 605 and a second classification tower receives video features 610, which can be the same as or similar to audio features 345 and video features 340, respectively, of FIG. 3. Each classification tower projects the respective audio features 605 and video features 610 onto n-learnable heads. Each head is associated with "query", "key", and "value" matrices. For example, each head in the audio classification tower is associated with query $Q_A$ 615a, key $K_A$ 620a, and value $V_A$ 625a matrices, and each head in the video classification tower is associated with query $Q_V$ 615b, key $K_V$ 620b, and value $V_V$ 625b matrices. Each row in these matrices corresponds to the features extracted at a particular time-step. "Query" and "key" matrices are multiplied 630 to get an audio attention map 635a and video attention map 635b, respectively. Each attention map is then multiplied 640 with the "value" matrix, generating one output per head. For example, the audio attention map 635a is multiplied 640 with the value matrix 625a, and the video attention map 635b is multiplied 640 with the value matrix 625b. These are then concatenated across heads and multiplied with another learnable matrix 645 to obtain audio output ($O_A$) 650a and video output ($O_V$) 650b. At fusion 650, a mean of the audio output ($O_A$) 650a and the video output ($O_V$) 650b is taken across the temporal axis and then concatenated and passed to subsequent MLP layers to obtain prediction probabilities 655.

The baseline multi-modal video classification model 600 performs a late fusion 650 of the two modalities after the video-level representations are obtained from the corresponding self-attention blocks 400 as shown in FIG. 4. As shown in the example illustrated in FIG. 6, the attention maps are not affected by what is happing in the other modality. That is, the attention map $O_A$ 650a is not affected by the attention map $O_B$ 650b (and vice versa).

In certain embodiments, to enhance its performance, the audio representations obtained from the corresponding self-attention block are influenced by visual features (and vice versa). Since the modalities may not be completely synchronized with each other in a particular video, the attention for the video may be related to the audio but only after some sort of transformation (e.g., shift or compression) is applied. Therefore, a non-linear guided attention framework is implemented for video categorization.

Figure 7:
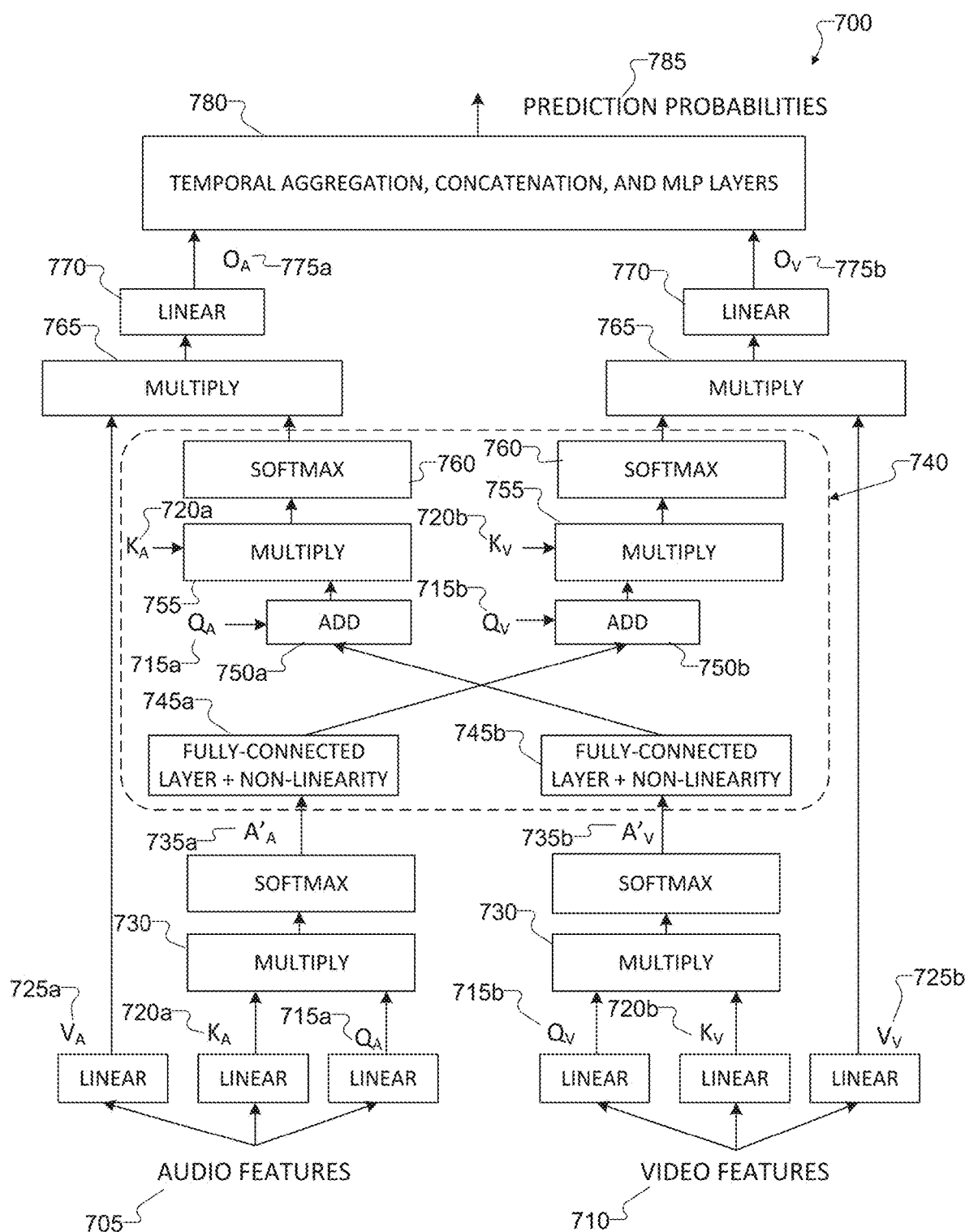
FIG. 7 illustrates an example cross-modal non-linear guided attention (CM-NGA) transformer-based multi-modal video classification model in accordance with this disclosure.

FIG. 7 illustrates a cross-modal non-linear guided attention (CM-NGA) transformer-based multi-modal video classification model 700 in accordance with this disclosure. The embodiment of the CM-NGA model 700 shown in FIG. 7 is for illustration only, and other embodiments could be used without departing from the scope of the present disclosure. The CM-NGA model 700 can be configured the same as, or similar to, the cross-modal correlation tower 370 of FIG. 3. In the example of the CM-NGA model 700 shown in FIG. 7, Q denotes query, K denotes key, V denotes value, A denotes attention map, and O denotes an output representation of the self-attention block. Subscript V denotes video modality, and subscript A denotes audio modality.

The CM-NGA model 700 includes two classification towers in which a first classification tower receives audio features 705 and a second classification tower receives video features 710, which can be the same as or similar to audio features 345 and video features 340, respectively, of FIG. 3. The CM-NGA model 700 computes the attention variables for each modality without considering the effect of other modality. For example, each classification tower projects the respective audio features 705 and video features 710 onto n-learnable heads. Each head in the audio classification tower is associated with query $Q_A$ 715a, key $K_A$ 720a, and value $V_A$ 725a matrices, and each head in the video classification tower is associated with query $Q_V$ 715b, key $K_V$ 720b, and value $V_V$ 725b matrices. Each row in these matrices corresponds to the features extracted at a particular time-step. "Query" and "key" matrices are multiplied 730 to get an audio attention map $A'_A$ 735a and video attention map $A'_V$ 735b, respectively, where the effects of the other modality are not seen yet.

Then, the CM-NGA model 700, in a cross-modal influence for attention calculation 740, non-linearly transforms the attention outputs from one modality before adding it to the query matrix of the other modality. For example, the attention output from non-linear transforms 745b is added 750a to $Q_A$ 715a, and the attention output from non-linear transforms 745a is added 750b to $Q_V$ 715b. Any non-linear function (such as sigmoid, tanh, and the like) can be used. In certain embodiments, a rectified linear unit (ReLU) function is utilized. The resultant matrix is used to re-compute attention values and output representations. That is, the attention maps, audio attention map $A'_A$ 735a and video attention map $A'_V$ 735b, are regenerated by performing similar multiplication 755 and softmax 760 operations. For example, the output of the addition of the query matrix and non-linear transform is multiplied with the value matrix to get the appropriate audio and video modality representations. For instance, the output of the add 750a function is multiplied 755 with $K_A$ 720a, and the output of the add 750b function is multiplied 755 with $K_V$ 720b. Note that the process can be repeated more than one time, which can lead to increases in training times.

Thereafter, each regenerated attention map is multiplied 765 with the "value" matrix, generating one output per head. For example, the regenerated audio attention map is multiplied 765 with the value matrix 725a, and the regenerated video attention map is multiplied 765 with the value matrix 725b. These are then concatenated across heads and multiplied with another learnable matrix 770 to obtain audio output ($O_A$) 775a and audio output ($O_V$) 775b. At fusion 780, a mean of audio output ($O_A$) 775a and video output ($O_V$) 775b is taken across the temporal axis and then concatenated and passed to subsequent MLP layers to obtain prediction probabilities 785. Accordingly, the prediction probabilities 785 include the effects of one modality on the other modality.

Figure 8A:
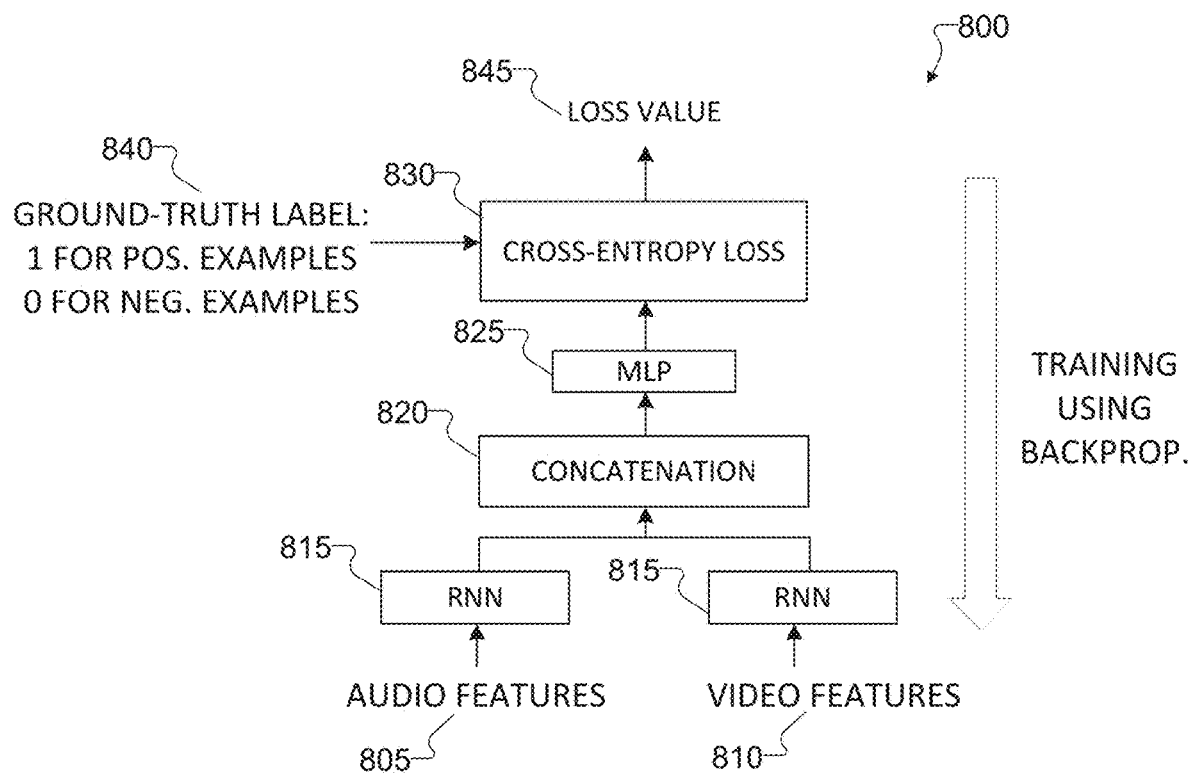
FIGS. 8A and 8B illustrate an example correlation tower (CT) in accordance with this disclosure.
Figure 8B:
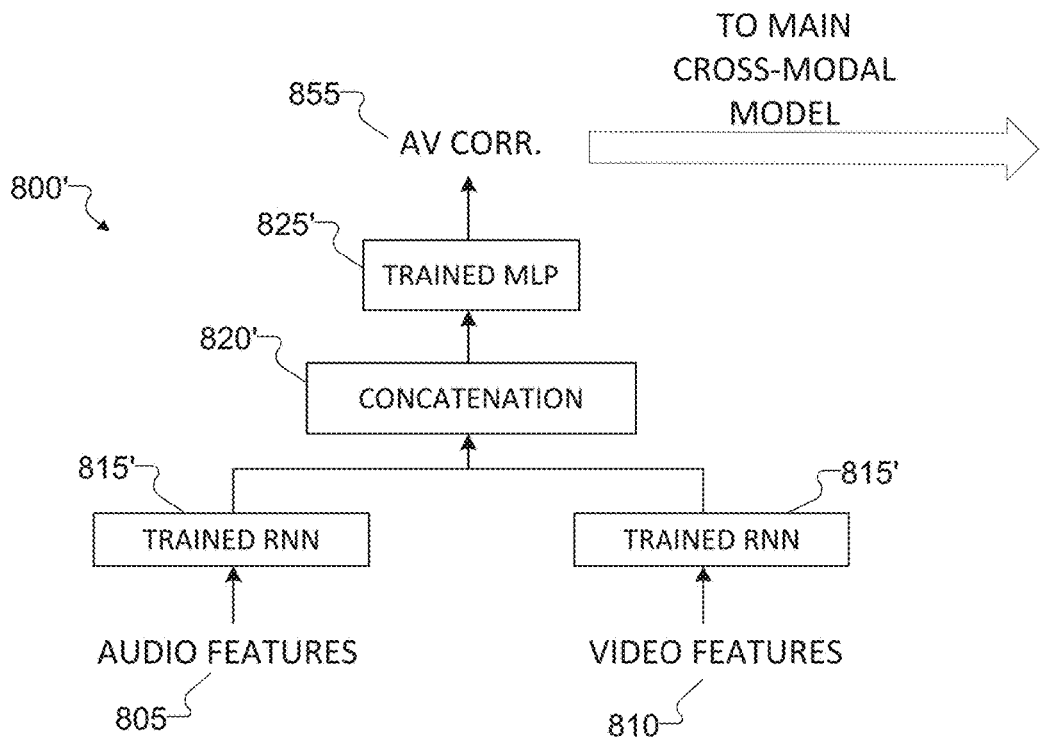

FIGS. 8A and 8B illustrate an example correlation tower (CT) 800 in accordance with this disclosure. More specifically, FIG. 8A illustrates a training correlation tower in accordance with this disclosure, and FIG. 8B illustrates a trained correlation tower in accordance with this disclosure. The embodiments of the CTs shown in FIGS. 8A and 8B are for illustration only, and other embodiments could be used without departing from the scope of the present disclosure. The CTs can be configured the same as, or similar to, the CT 355 of FIG. 3.

The CT 800 is configured to receive audio features 805 and video features 810, which can be the same as or similar to audio features 345 and video features 340, respectively, of FIG. 3. The CT 800 includes RNN modules 815, a concatenation module 820, MLP layers 825, and a cross-entropy loss layer 830.

In certain embodiments, the attention-based multi-modal video classification system 300 includes a correlation tower that modulates how much influence one modality's attention outputs should have on other modalities. For example, in a video dataset, there may be some videos in which there is no direct correlation between the video and the audio channels. As an example, a file may have a video of a dog running with a song playing in the background. In such cases, the modalities should not influence each other. Accordingly, the CT 800 is trained on positive and negative examples of audio/video correlation, such as by using cross-entropy loss. The positive examples define a condition in which the audio and video modalities are correlated with each other. The negative examples define a condition in which the audio and video modalities are not correlated with each other. To obtain the positive examples, any number of videos with correlated modalities are provided to the CT 800. To obtain the negative examples, video features can be taken from a first video file, and audio features can be taken from a second video file. For example, video features may be taken from a video of a soccer match, and audio features may be taken from a video with a barking dog. The ground truth label 840 is provided to the cross-entropy loss layer 830 to train the CT 800 regarding whether a positive example or negative example is provided. Thereafter, the CT 800 produces a loss value 845 indicated whether or not the examples were correlated. That is, given audio and video features, the CT 800 outputs the AV correlation on a value line between zero and one. Once the model is trained, the parameters are frozen or set.

The correlation tower 800 is separately trained from the main cross-modal model, and the parameters are frozen after training is finished. When training the main cross-modal model for video classification, the output of the correlation tower is used as the prediction of whether the audio and video channels are correlated with each other. This signal is then multiplied with the cross-modal non-linear guided attention term, which suitably attenuates the cross-modal signal when the modalities are not correlated.

Once trained, the CT 800' receives audio features 805 and video features 810, which can be the same as or similar to audio features 345 and video features 340, respectively, of FIG. 3. The audio features 805 and video features 810 are fed to attention-RNN models 815'. The RNN models 815' can be any attentional model, such as self-attention block 400 or self-attention block 500. The outputs of RNN models 815' are concatenated in the concatenation module 820', and output summary vectors are fed to MLP layers 825'. The final MLP layer 825' has one neuron with sigmoid activation, which denotes the audio-video correlation (AV corr.) 855 lying between 0 and 1. For example, the AV corr. 855 can be the same as or similar to the audio-video correlation coefficient 360 of FIG. 3.

Figure 9:
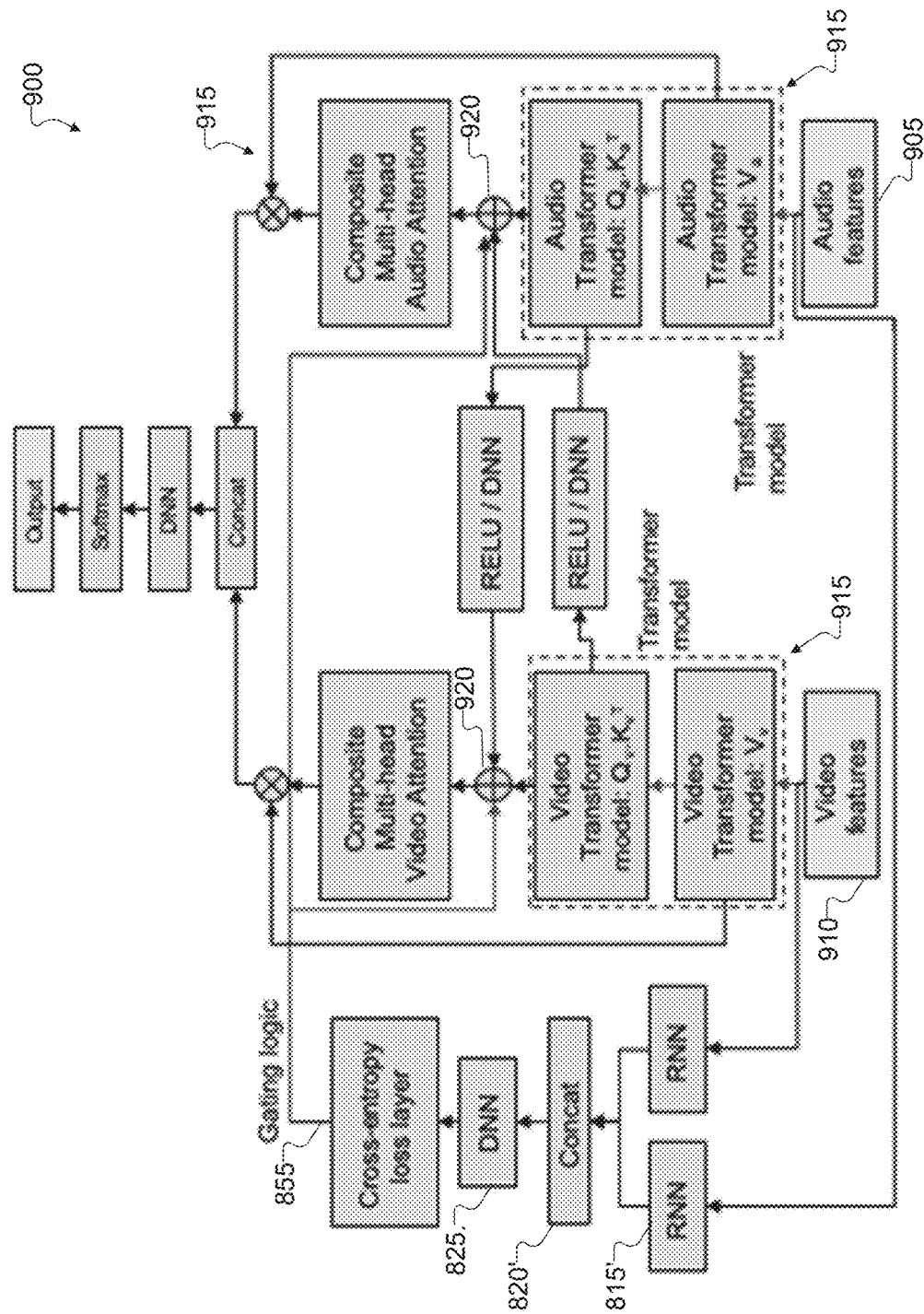
FIG. 9 illustrates an example separately-trained correlation tower used to regulate cross-modal influence in a main video classification model in accordance with this disclosure.

FIG. 9 illustrates an example of a multimodal classification system 900 that comprises a separately-trained correlation tower used to regulate cross-modal influence in a main video classification model in accordance with this disclosure. The embodiment of the multimodal classification system 900 shown in FIG. 9 is for illustration only, and other embodiments could be used without departing from the scope of the present disclosure. The multimodal classification system 900 can be configured the same as, or similar to, the attention-based multi-modal video classification system 300 shown in FIG. 3.

Audio features 905 and video features 910, which can be the same as or similar to audio features 345 and video features 340, respectively, of FIG. 3, are received. Each of the audio features 905 and video features 910 are provided to a respective classification tower 915, such as classification towers containing TC self-attention blocks 500 shown in FIG. 5. Additionally, the audio features 905 and video features 910 are provided to respective RNN modules 815' with outputs concatenated in concatenation module 820', and output summary vectors are fed to MLP layers 825', to produce AV corr. 855. The AV corr. 855 is provided as gating logic to each classification tower 915 at node 920 to determine how much cross-modal attention should be given for the respective frame.

In certain embodiments, the transformer-based multi-modal video classification system includes the TC self-attention block 500, CM-NGA model 700, and CT 800'. As mentioned before, the correlation tower 800' is trained beforehand, and the weights frozen. The inputs to the novel self-attention block include audio/video features and the AV correlation value. Note that the outputs obtained from the novel self-attention block are fed to temporal aggregation and subsequent layers as shown in FIG. 3. Compared to a baseline transformer-based multi-modal model, this model performs better on video classification tasks. The sections in the algorithm where TC, CM-NGA, and CT are implemented are noted below.

In the multi-modal self-attention block, subscript 'a' refers to an audio modality, and subscript 'v' refers to a video modality. The features $X_v$ and $X_a$ and the correlation value ($C_{av}$), which is obtained from the trained correlation tower, are input to the multi-modal self-attention block. As indicated above, for each modality, Q refers to query, K refers to key, V refers to value, A refers to attention map, and O refers to output obtained. NL refers to a non-linear function, such as a sigmoid, ReLU, and the like. K is the number of iterations for which cross-modal influence is taken into account for attention and output calculations, which is set to one in the illustrated example. The dimensionality of the query vectors is represented by d, and the one-dimensional operation is represented by conv1D. The variables $W_v^Q$, $W_v^K$, $W_v^V$, $W_\alpha^Q$, $W_\alpha^K$, $W_\alpha^V$, $w_v^o$, and $w_\alpha^o$ are trainable parameters present in the baseline attention-based architecture. The variables $TC_v^Q$, $TC_v^K$, $TC_v^V$, $TC_\alpha^Q$, $TC_\alpha^K$, and $TC_\alpha^V$ are learnable convolutional kernels enforcing temporal coherence. The variables $W_{\alpha v}$ and $W_{v\alpha}$ are learnable parameters required for the cross-modal non-linear guided attention framework. In some embodiments, the algorithm is as follows:

```
Function N – Self Attention
    |for m in {a, v} do
    |    |Q_m, K_m, V_m = X_m W_m^Q, X_m W_m^K, X_m W_m^V
    |    |    ########TC########
    |    | Q_m = conv1D (Q_m, TC_m^Q)
    |    | K_m = conv1D (K_m, TC_m^K)
    |    | V_m = conv1D (V_m, TC_m^V)
    |    |################
    |    |_A_m = softmax (E_m)
    |        #######CM-NGA#######
    |    counter = 0
    |    while counter < K do
    |    |####CM-NGA regulated by CT####
    |    |Q_a = Q_a + C_av * NL(W_av A_v)
    |    |Q_v = Q_v + C_av * NL(W_va A_a)
    |    |########################
    |    |for m in {a, v} do
    |    |    |Q_m = conv1D (Q_m, TC_m^Q)##TC##
    |
    |    |    |
    |    |    |A_m = softmax( Q_m K_m^T / √d )
    |    |    |
    |
    |    | |_O_m = A_m V_m
    |    |_counter = counter + 1
    |    ###############
    |    O_v = O_v W_v^o
    |    O_a = O_a W_a^o
    |_   return O_v, O_a
```

In certain embodiments, for TC, CM-NGA, and CT being implemented in attention-RNN based architectures, gated recurrent unit (GRU) blocks are used. In the multi-modal attentional GRU block, subscript 'a' refers to an audio modality, and subscript 'v' refers to a video modality. The features $X_v$ and $X_a$ and variables the correlation value ($C_{av}$), which is obtained from the trained correlation tower, are input to the multi-modal attentional GRU block. NL refers to a non-linear function, such as a sigmoid, ReLU, and the like. K is the number of iterations for which cross-modal influence is taken into account for attention and output calculations, which is set to one in the illustrated example. The dimensionality of the query vectors is represented by d, and the one-dimensional operation is represented by conv1D. The variables $GRU_\alpha$ and $GRU_v$ are the trainable GRU blocks used in the two modalities. The variables $W_v^f$, $W_\alpha^f$, $w_v^8$, and $w_\alpha^8$ are trainable parameters present in the baseline GRU based architecture. The variables $TC_v^H$, $TC_v^E$, $TC_\alpha^H$, and $TC_\alpha^E$ are learnable convolutional kernels enforcing temporal coherence. The variables $W_{\alpha v}$ and $W_{v\alpha}$ are learnable parameters required for the cross-modal non-linear guided attention framework. In some embodiments, the algorithm is as follows:

```
Function GRU
| for m in {a, v} do
|    | H_m = GRU_m (X_m)
|    | H_m = conv1D (H_m, TC_m^H) ##TC##
|    | L_m = H_m W_m^f
|    | E_m = tanh(L_m) w_m^8
|    | E_m = conv1D (E_m, TC_m^E) ##TC##
|    |_A_m = softmax (E_m)
| #######CM-NGA#######
|    counter = 0
|    while counter < 0 do
|    | ###CM-NGA regulated by CT###
|    | L_a = L_a + C_av * NL(W_av A_v)
|    | L_v = L_v + C_av * NL(W_va A_a)
|    |    #####################
|    | for m in {a, v} do
|    | |  E_m = tanh(L_m) w_m^8
|    | |  E_m = conv1D (E_m, TC_m^E) ##TC##
|    | |_A_m = softmax (E_m)
|    |_ counter = counter + 1
|    #########################
|    O_v = H_v^T A_v
|    O_a = H_a^T A_a
|_   return O_v, O_a
```

Figure 10:
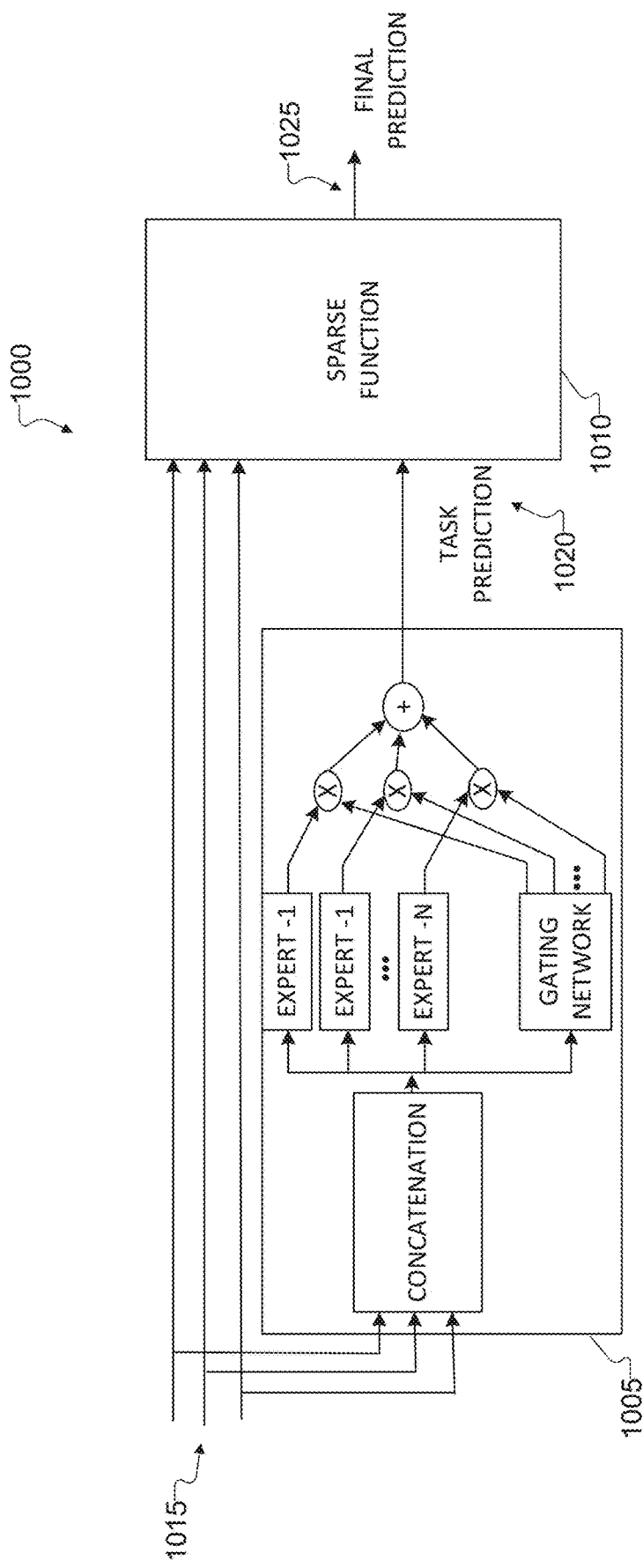
FIG. 10 illustrates example embeddings from various modalities in accordance with this disclosure.

FIG. 10 illustrates example embeddings from various modalities in accordance with this disclosure. The embodiments of the embeddings from various modalities 1000 shown in FIG. 10 are for illustration only. Other embodiments could be used without departing from the scope of the present disclosure.

In certain embodiments, a gated mixture of experts (gMOE) 1005 and sparse fusion (SF) 1010 are combined to come up with a new model design. The gMOE 1005 will consider the embeddings from the various modalities 1015 and output a task prediction 1020. The SF layer 1010 receives the task prediction 1020 along with the outputs from the various modalities 1015. The output 1025 of the SF layer 1010 can be considered as the final prediction.

Figure 11:
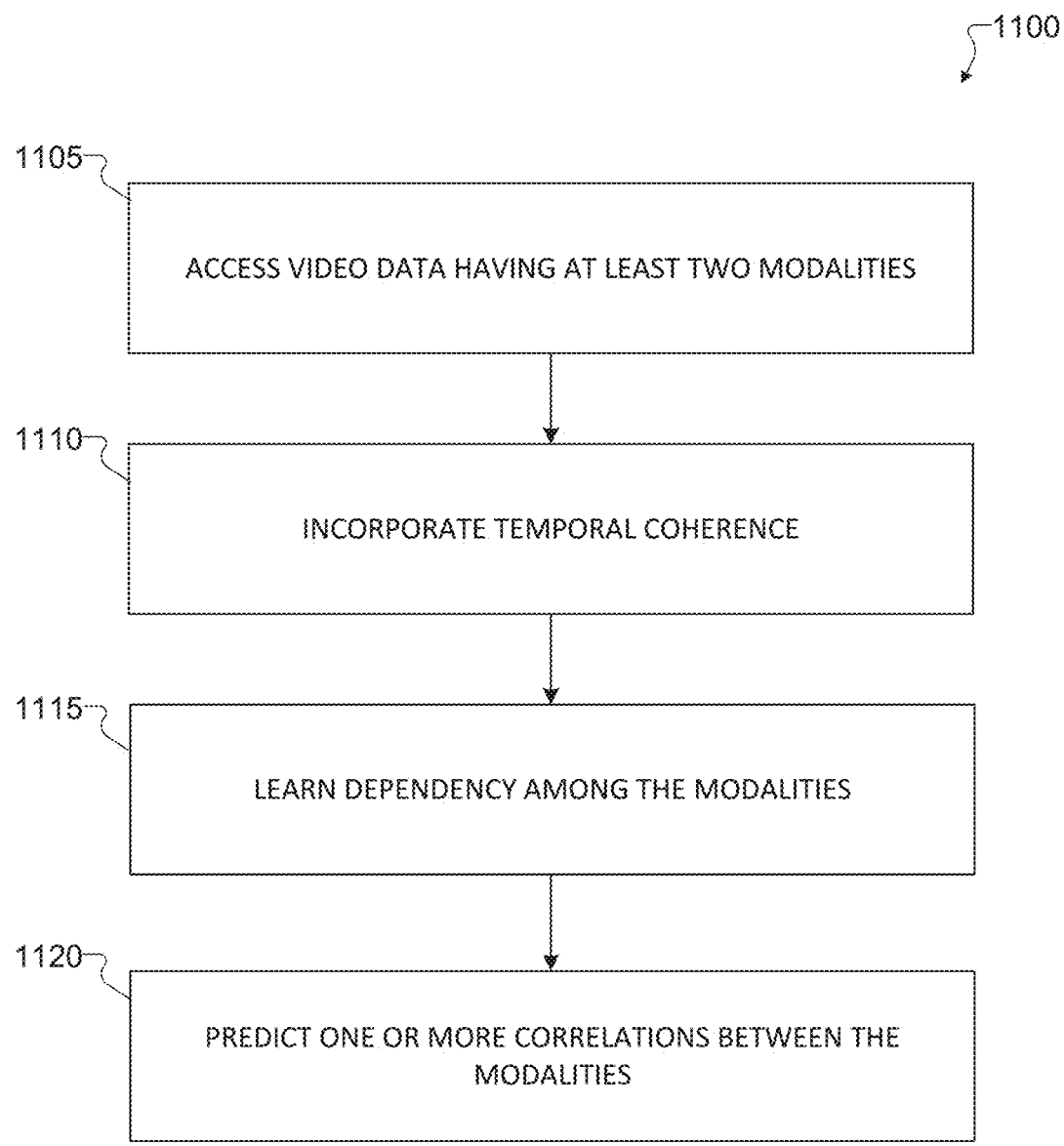
FIG. 11 illustrates an example process for predicting one or more correlations between at least two modalities in accordance with this disclosure.

FIG. 11 illustrates an example process 1100 for predicting one or more correlations between at least two modalities in accordance with this disclosure. While FIG. 11 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1100 depicted can be implemented by one or more processors in a recommendation system, such as by one or more processors 120 of an electronic device 101 or server 106. In certain embodiments, one or more steps of the process 1100 are performed by one or more processors in an electronic device or server performing a machine learning (i.e., an artificial intelligence) process.

In operation 1105, a prediction system accesses video data that includes at least two different modalities. For example, in response to a user searching for, selecting, or viewing content, the server 106 can obtain a video file having at least two modalities, such as an audio modality and a video modality. The video file can be obtained in real time or via a subsequent review of a user history log. For example, the server 106 in the recommendation system can log a user's various behavior events. As a particular example, the server 106 may log when a user is browsing in a video database, such as NETFLIX, clicking a movie, watching a movie, rating a movie, and the like, and store such data for later processing. User behavior logs are normally collected on a user device, such as via the electronic device 101, in real time and transferred to the server 106 in real time or every few hours. As a result, the server 106 can create new user-item interactions and update existing user-item interactions after a daily processing or at other times. In certain embodiments, the recommendation system may include a data retention policy. For example, the server 106 may only use the logs from the last two months for prediction. In this case, the user-item interactions that happened more than two months ago will be removed during daily processing or at other times.

In operation 1110, the prediction system uses a convolutional neural network layer to incorporate temporal coherence into a machine learning model architecture configured to process the video data. The prediction system incorporates temporal coherence into video processing ML models, using them to influence the model architecture and hence the prediction mechanism. A temporal coherence can be efficiently instantiated in multiple architectures (e.g., attention-RNN, NetVLAD, transformer models) using a single convolutional neural network layer.

In operation 1115, the prediction system learns a dependency among the at least two different modalities in an attention space of the video processing machine learning model architecture. The prediction system can learn dependencies between different modalities in the attention space, as opposed to the input or output space, making it more accurate and robust. The microgenre-based hyper-personalization system learns this dependency and can use it in conjunction with many video categorization approaches, including attention-RNN, NetVLAD, and transformer-based approaches.

In operation 1120, the prediction system can predict one or more correlations among the at least two different modalities. The prediction system can predict correlation between various modalities of the data, and the model identifies when one modality is correlated with other modalities and controls the use of cross-modal learning accordingly. Using this correlation tower in conjunction with the cross-modal learning leads to a superior model capable of understanding the interdependency between the modalities.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
   at least one memory configured to store a database; and
   at least one processor configured to:
      access video data that includes at least two different modalities;
      implement a convolutional neural network layer to incorporate temporal coherence between the at least two different modalities into an attention space of a machine learning model architecture configured to process the video data;
      learn dependency among the at least two different modalities in the attention space of the machine learning model architecture; and
      implement one or more correlation towers to predict one or more correlations among the at least two different modalities;
   wherein, to incorporate the temporal coherence, the at least one processor is configured to associate similar fine-grained categories to a set of frames in the video data that are within a defined temporal proximity, the defined temporal proximity based on an approximation of similarity between frames in the video data; and
   wherein the one or more correlation towers are trained to predict, for at least a first modality of the at least two different modalities, its correlation to at least a second modality of the at least two different modalities.

2. The electronic device of claim 1, wherein, to incorporate the temporal coherence, the at least one processor is further configured to associate similar values to attention values corresponding to frames in the set, wherein the set of frames lacks a scene transition.

3. The electronic device of claim 1, wherein, to implement the one or more correlation towers to predict the one or more correlations, the at least one processor is configured to identify when at least the first modality is correlated with at least the second modality.

4. The electronic device of claim 1, wherein the at least two different modalities include at least an image modality and an audio modality.

5. The electronic device of claim 1, wherein, to learn the dependency among the at least two different modalities in the attention space, the at least one processor is configured to generate an attention map of one modality affected by input features of another modality.

6. The electronic device of claim 1, wherein, to implement the one or more correlation towers to predict the one or more correlations, the at least one processor is configured to identify when one modality is correlated with other modalities and control the dependency among the at least two different modalities.

7. The electronic device of claim 1, further comprising a recurrent neural network layer, wherein:
   the recurrent neural network layer is trained on positive and negative correlation samples of at least two modalities; and
   after training, one or more parameter settings are frozen.

8. A method comprising:
   accessing video data that includes at least two different modalities;
   using a convolutional neural network layer to incorporate temporal coherence between the at least two different modalities into an attention space of a machine learning model architecture configured to process the video data;
   learning dependency among the at least two different modalities in the attention space of the machine learning model architecture; and
   using one or more correlation towers to predict one or more correlations among the at least two different modalities;
   wherein using the convolutional neural network layer to incorporate the temporal coherence comprises associating similar fine-grained categories to a set of frames in the video data that are within a defined temporal proximity, the defined temporal proximity based on an approximation of similarity between frames in the video data; and
   wherein the one or more correlation towers are trained to predict, for at least a first modality of the at least two different modalities, its correlation to at least a second modality of the at least two different modalities.

9. The method of claim 8, wherein using the convolutional neural network layer to incorporate the temporal coherence further comprises associating similar values to attention values corresponding to frames in the set, wherein the set of frames lacks a scene transition.

10. The method of claim 8, wherein using the one or more correlation towers to predict the one or more correlations comprises identifying when at least the first modality is correlated with at least the second modality.

11. The method of claim 8, wherein the at least two different modalities include at least an image modality and an audio modality.

12. The method of claim 8, wherein learning the dependency among the at least two different modalities in the attention space comprises:
generating an attention map based of one modality affected by input features of another modality.

13. The method of claim 8, wherein using the one or more correlation towers to predict the one or more correlations comprises identifying when one modality is correlated with other modalities and control the dependency among the at least two different modalities.

14. The method of claim 8, further comprising training a recurrent neural network layer on positive and negative correlation samples of at least two modalities; and
after training, freezing one or more parameter settings.

15. A non-transitory machine-readable medium comprising instructions that, when executed by at least one processor of an electronic device, cause the at least one processor to:
access video data that includes at least two different modalities;
implement a convolutional neural network layer to incorporate temporal coherence between the at least two different modalities into an attention space of a machine learning model architecture configured to process the video data;
learn dependency among the at least two different modalities in the attention space of the machine learning model architecture; and
implement one or more correlation towers to predict one or more correlations among the at least two different modalities;
wherein the instructions that when executed cause the at least one processor to incorporate the temporal coherence comprise instructions that when executed cause the at least one processor to associate similar fine-grained categories to a set of frames in the video data that are within a defined temporal proximity, the defined temporal proximity based on an approximation of similarity between frames in the video data; and
wherein the one or more correlation towers are trained to predict, for at least a first modality of the at least two different modalities, its correlation to at least a second modality of the at least two different modalities.

16. The non-transitory machine-readable medium of claim 15, wherein the instructions that when executed cause the at least one processor to incorporate the temporal coherence further comprise:
instructions that cause the at least one processor to associate similar values to attention values corresponding to frames in the set, wherein the set of frames lacks a scene transition.

17. The non-transitory machine-readable medium of claim 15, wherein the instructions that when executed cause the at least one processor to implement the one or more correlation towers to predict the one or more correlations comprise:
instructions that when executed cause the at least one processor to identify when at least the first modality is correlated with at least the second modality.

18. The non-transitory machine-readable medium of claim 17, wherein the at least two different modalities include at least an image modality and an audio modality.

19. The non-transitory machine-readable medium of claim 15, wherein the instructions that when executed cause the at least one processor to learn the dependency among the at least two different modalities in the attention space comprise:
instructions that when executed cause the at least one processor to generate an attention map of one modality affected by input features of another modality.

20. The non-transitory machine-readable medium of claim 15, wherein the instructions that when executed cause the at least one processor to implement the one or more correlation towers to predict the one or more correlations comprise:
instructions that when executed cause the at least one processor to identify when one modality is correlated with other modalities and control the dependency among the at least two different modalities.

* * * * *